(12) United States Patent
Mezzalira et al.

(10) Patent No.: US 8,770,233 B2
(45) Date of Patent: Jul. 8, 2014

(54) FLEXIBLE HOSE STRUCTURE WITH A INTERLACED REINFORCEMENT

(75) Inventors: Alessandro Mezzalira, Sandrigo (IT); Gianni Nelti, Sandrigo (IT)

(73) Assignee: Fitt S.p.A., Sandrigo (VI) (IT)

( * ) Notice: Subject to any disclaimer, the term of this patent is extended or adjusted under 35 U.S.C. 154(b) by 3 days.

(21) Appl. No.: 13/812,470

(22) PCT Filed: Jul. 18, 2011

(86) PCT No.: PCT/IB2011/053197
§ 371 (c)(1),
(2), (4) Date: Sep. 16, 2013

(87) PCT Pub. No.: WO2012/014122
PCT Pub. Date: Feb. 2, 2012

(65) Prior Publication Data
US 2014/0110013 A1 Apr. 24, 2014

(30) Foreign Application Priority Data
Jul. 30, 2010 (IT) ................................ VI2010A0217

(51) Int. Cl.
*F16L 11/02* (2006.01)
(52) U.S. Cl.
USPC ............ 138/127; 138/125; 138/126; 138/130
(58) Field of Classification Search
CPC ........ F16L 11/02; F16L 11/085; F16L 11/086
USPC .................................. 138/125, 126, 127, 130
See application file for complete search history.

(56) References Cited

U.S. PATENT DOCUMENTS

| | | | | |
|---|---|---|---|---|
| 2,264,213 A * | 11/1941 | Larkin | ........................... | 66/190 |
| 2,870,619 A * | 1/1959 | Greczin | ..................... | 66/169 R |
| 3,682,201 A * | 8/1972 | Atwell et al. | ................. | 138/125 |
| 3,779,308 A * | 12/1973 | Buhrmann et al. | ............. | 165/51 |
| 4,679,599 A * | 7/1987 | Newberry et al. | ............ | 138/104 |
| 6,199,594 B1 | 3/2001 | Mezalira | | |
| 6,615,876 B2 * | 9/2003 | Badders et al. | ............... | 138/125 |
| 2013/0092276 A1 * | 4/2013 | Caneva et al. | ................ | 138/123 |

FOREIGN PATENT DOCUMENTS

| | | |
|---|---|---|
| EP | 0527512 | 2/1993 |
| EP | 1780458 | 5/2007 |
| FR | 1284920 | 2/1962 |
| FR | 2793866 | 11/2000 |
| FR | 2849148 | 6/2004 |
| WO | 2010052657 | 5/2010 |

* cited by examiner

*Primary Examiner* — James Hook
(74) *Attorney, Agent, or Firm* — Themis Law

(57) ABSTRACT

A flexible hose structure includes at least one inner tubular layer of a first polymeric material defining a longitudinal axis, at least one meshed intermediate reinforcement layer arranged on the inner layer and having at least one first series of yarns defining first chained wales and first courses arranged according to a helical progression with a first pitch of predetermined length, and at least one second series of yarns defining second chained wales and second courses arranged according to a helical progression with a second pitch of predetermined length. The first pitch is a multiple of the second pitch, and the first wales (and the second wales are mutually interlaced with respective meshes not in a chain to exert an independent resistance to radial expansion on the inner layer.

10 Claims, 2 Drawing Sheets

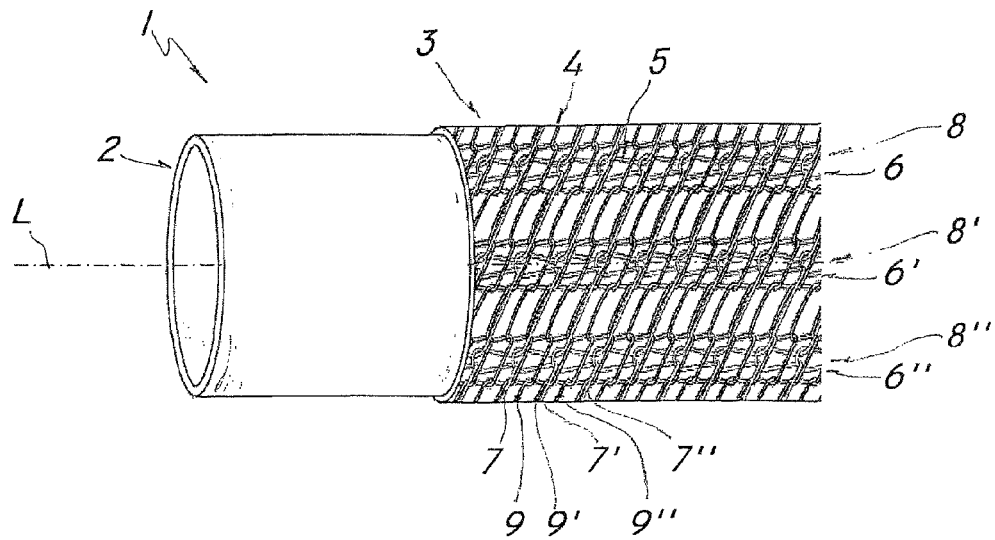
FIG. 1
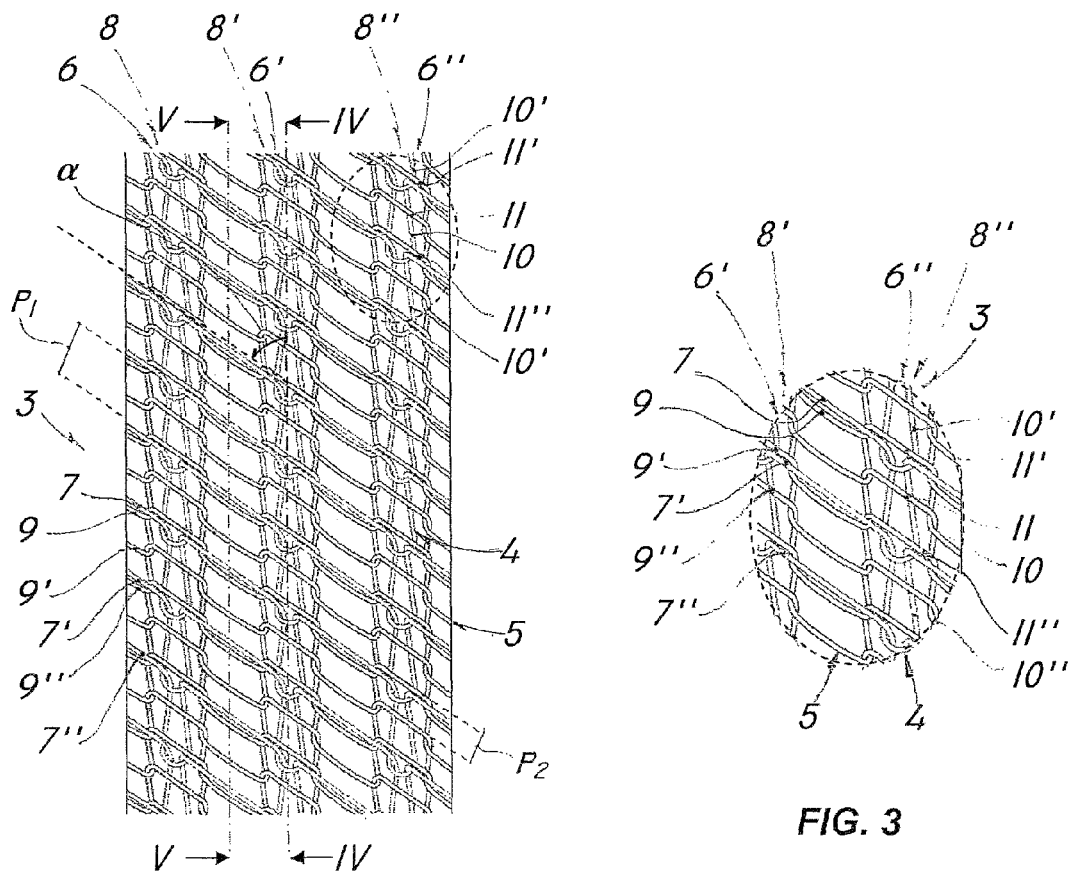
FIG. 2
FIG. 3

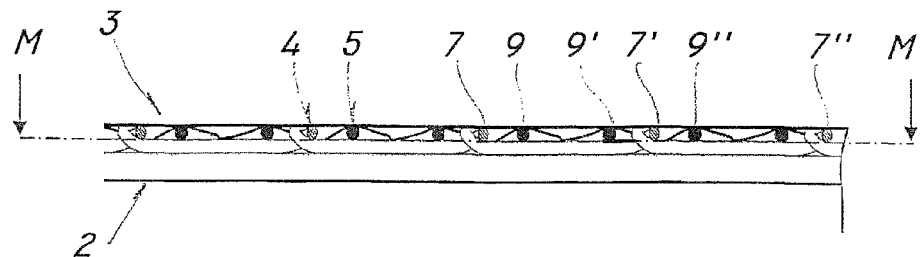
FIG. 4
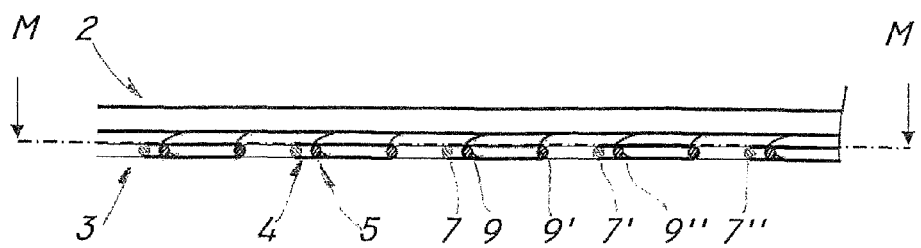
FIG. 5
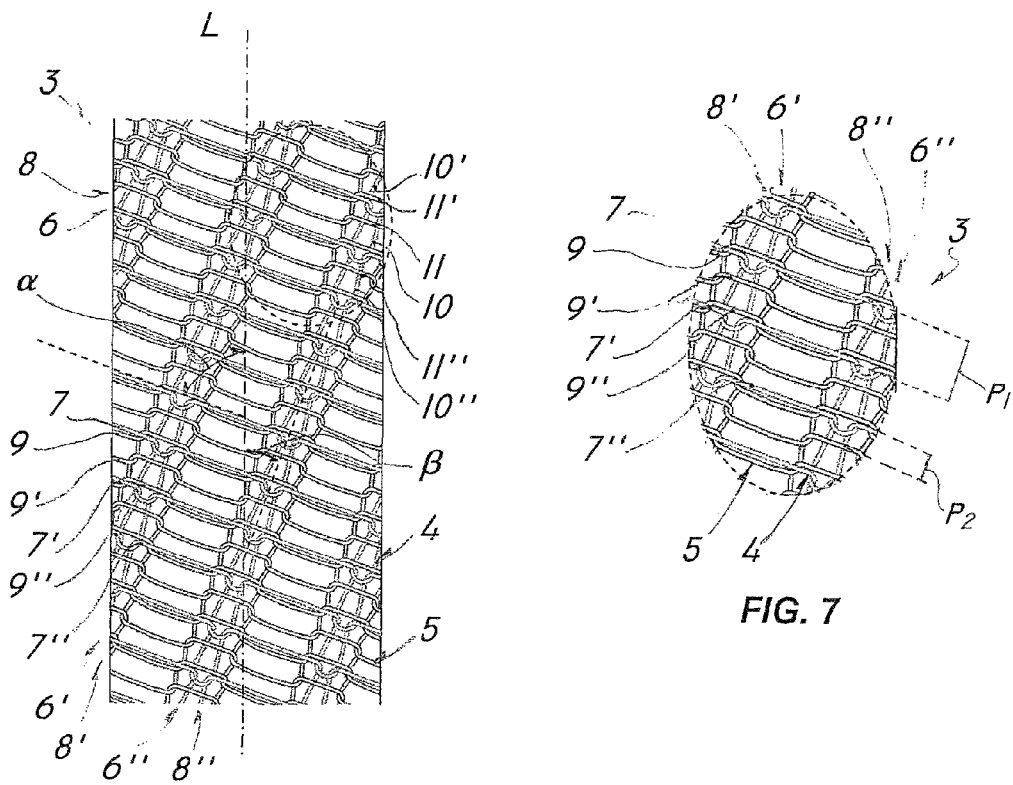
FIG. 6
FIG. 7

FLEXIBLE HOSE STRUCTURE WITH A INTERLACED REINFORCEMENT

FIELD OF THE INVENTION

The present invention is generally applicable to the technical field of flexible hoses, and particularly its object is a flexible hose structure.

More specifically, the object of the finding is a flexible hose structure with a meshed reinforcement having high resistance to pressure.

BACKGROUND OF THE INVENTION

As known, irrigation hoses, in particular flexible ones, generally comprise one or more overlapped tubular layers made from polymeric material between which one or more reinforcing layers are usually arranged.

The configuration of the reinforcement layer varies as a function of the mechanical characteristics that it is wished to give the hose, like, for example, resistance to pressure or to bursting, flexibility and ability to avoid the "kinking" phenomena, i.e. the squashing of the hose when it is subjected to twisting that causes the formation of localized choking.

The most common types of reinforcement are net-type reinforcements, in which the yarns are overlapped to form a mesh, and meshed-type reinforcement, in which the yarns are worked together to form mesh in a chain, also known as "fricae"-type mesh.

This second type of reinforcement, although it is relatively expensive and has poorer performance in terms of resistance to pressure, is generally preferred to net-type reinforcement since it makes it possible to have hoses with high malleability, i.e. high resistance to kinking.

Therefore, hoses with meshed reinforcement are particularly suitable for being used as irrigation hoses, particularly for use at home or as a hobby.

In the case in which it is necessary to give the hose both high malleability and high resistance to bursting, many overlapped reinforcement layers are used.

For example, EP 1156252 discloses an irrigation hose having two overlapped meshed reinforcement layers, separated by an intermediate layer of polyurethane foam. This solution, although it allows greater resistance to bursting, has low flexibility and is difficult to produce, in particular due to the need to arrange the two meshed layers in two distinct steps.

EP0794377 also discloses a gardening hose in which the reinforcement is formed from a first meshed layer and from a second coiled layer overlapped to the first.

Such a solution has also not proven to be satisfactory due to an increase in resistance to bursting that is not proportional to the amount of fibers inserted with respect to the single meshed layer and to a reduction in malleability, as well as to obvious difficulties in production.

FR 2849148, on the other hand, discloses a flexible gardening hose comprising a reinforcement consisting of a first meshed layer with tricot type mesh interlaced with a second layer, also meshed with mesh of the same type.

The two layers are formed from distinct and identical series of yarns, formed from the same type of fibers, so as to obtain two layers having the same number of meshes arranged on coils with the same pitch and inclination.

Moreover, every mesh belonging to one of the layers is linked with a pair of meshes of the other layer, so as to define a reinforcement defined by two distinct but mutually bound layers.

Such a solution gives the hose high resistance to pressures, at the same time maintaining high malleability.

However, a solution of this type does not bring appreciable variations to resistance to bursting of the hose, which is only slightly increased with respect to normal double layer reinforcement hoses, thus in a not very efficient manner with respect to the greater overall weight of the reinforcement layer and the higher material costs.

Irrigation hoses are also known in which the yarns of the reinforcement layer are formed from fibers with high toughness or in any case greater toughness with respect to that of polyester fiber, which represents the most commonly used fiber.

For example, US 2001/39972 discloses an irrigation hose comprising a first coiled reinforcement layer and a second meshed layer overlapped to the first. In a possible configuration thereof, one of the 20 layers is made entirely from Kevlar®.

The use of a reinforcement material with high mechanical resistance characteristics considerably increases the manufacturing costs of the hose, making it disadvantageous to use these configurations for commonly-used and relatively low-cost flexible irrigation hoses.

SUMMARY OF THE INVENTION

The purpose of the present finding is to overcome the aforementioned drawbacks, by making a flexible hose structure with high resistance that has characteristics of high efficiency and relative cost-effectiveness.

A particular purpose of the present finding is to make a flexible hose structure with high resistance to bursting that, while reducing the overall amount of material used for the reinforcement, has increased resistance to bursting.

A further purpose of the finding is to make a flexible hose structure with high resistance that has high malleability.

Yet another purpose is to make a flexible hose structure that has low deformability even at high pressures.

A further purpose is to make a flexible hose structure with high resistance in which the reinforcement layer can be produced in a single step, making the entire manufacturing step of the hose particularly quick and simple.

Yet another purpose of the finding is to make a flexible hose structure with high resistance that allows the use of yarns of different kind or of differing toughness and acting independently differently from one another so as to be able to use different combinations and adapt the characteristics of resistance and expansion of the hose to the specific requirements.

Yet another purpose of the finding is to make a flexible hose structure with high resistance that has a relatively low thickness.

Such purposes, as well as others that will become clearer hereafter, are accomplished by a flexible hose structure with high resistance, in accordance with claim 1, comprising at least one inner tubular layer of a first polymeric material defining a longitudinal axis, at least one meshed intermediate reinforcement layer arranged on said first layer and consisting of yarns of a fibrous material, a possible outer tubular protective layer made from a second polymeric material.

The reinforcement layer comprises a first series of yarns defining first chained wales and first courses with at least said courses arranged according to a helical progression with a first pitch of predetermined length, and a second series of yarns defining second chained wales and second courses with at least said courses arranged according to a helical progression with a second pitch of predetermined length.

According to a peculiar characteristic of the finding, the first pitch is a multiple of the second pitch. Moreover, the first and second wales are interlaced and not linked together.

Basically, the wales defined by the first series of yarns will be interlaced with the wales defined by the second series of yarns to define two portions of the same meshed reinforcement layer that are coupled with one another.

However, the meshes of the first series of yarns will only by linked to each other and not with the meshes of the second series of yarns, and vice-versa.

In this way, each of the series of woven yarns can exert a resistance to radial stretching on the inner layer independently with respect to the other series of yarns.

In particular, the tensile stresses directed along any direction tangent to the meshed layer and that develop on the single meshes due to the pressure inside the hose do not transmit from the meshes of the first series to the meshes of the second series.

It should also be understood that there can be further series of yarns that can be meshed to define respective chained wales and courses wound in a coil with pitch that is a multiple or submultiple of the first and/or second pitch and with wales that are interlaced but not linked with the first and second wales.

Advantageously, the first and the second thermoplastic polymeric material that respectively form the first and the possible second layer can be compatible with each other.

In the present text, by the term "compatible materials" or derivates we mean materials that have chemical and/or physical compatibility with each other, i.e. materials that, once coupled, create a joint suitable for withstanding the transfer of traction or shearing forces through the contact surface. It follows from this that there will be maximum compatibility between materials that are identical or in any case having the matrix of the same base.

Suitably, the first and the second polymeric material can comprise a plasticized PVC (polyvinyl chloride)-based matrix.

Preferably, both of such materials can comprise a plasticized PVC-based matrix.

In the present text, by the term "matrix" of a polymer or derivates we mean a polymeric material capable of providing the molecular structure of the finished product.

By the term "-based matrix" or derivatives together with the name of a given polymeric material we mean a polymeric material capable of providing the molecular structure of the given polymeric material, the name of which goes before the phrase "-based matrix", to the finished product.

According to a further particularly advantageous aspect of the finding, the number of yarns of the first series will be half the number of yarns of the second series.

Moreover, at least one yarn of the first series, i.e. all of the yarns of the first series, can comprise or consist of a fiber with high toughness having a count of a value equal to at least 1500 mN/tex measured in accordance with standard EN ISO 2062.

In particular, the fiber with high toughness can be selected from the group comprising aramid fibers, such as Kevlar®, Nomex® or Twaron®, high-modulus polyethylene fibers, poly-ether-ether-ketone fibers, carbon fiber, metallic fibers, basalt fibers or hybrid fibers obtained from the coupling of two or more of the above.

Thanks to this combination of characteristics it will be possible to use a limited amount of high-count fibers, generally more expensive than the polyester fiber normally used for the reinforcement layers in flexible irrigation hoses, in any case obtaining comparable if not increased resistance values with respect to hoses with double reinforcement layer one of which is made entirely from high-count fiber.

In a preferred but not exclusive embodiment, the high-toughness fibers can have a toughness of at least 1800 mN/tex, preferably at least 2000 mN/tex and even more preferably at least 2150 mN/tex.

Thanks to such a configuration, the high malleability typical of the reinforcement layer with tricot meshes is maintained, at the same time obtaining a high resistance to internal pressure with relatively low process costs.

The fibers making up the possible remaining yarns of the first series and the yarns of the second series can be made from any material commonly used in the field.

For example, it is possible to use natural, synthetic or artificial fibers without distinction. For example, it is possible to use polyester with relatively low toughness, for example close to 1100 mN/tex.

Nevertheless, it should be understood that, in the present finding, it is possible to use any combination of fibers both for the yarns of the first and of the second series and/or of possible further series of yarns. For example, one or more yarns of the first and/or of the second series or of possible further series of yarns can be made with high-toughness or low-toughness fibers.

Advantageous embodiments of the hose structure according to the present finding are obtained in accordance with the dependent claims.

BRIEF DESCRIPTION OF THE DRAWINGS

Brief description of the drawings Further characteristics and advantages of the finding will become clearer in light of the detailed description of preferred but not exclusive embodiments of a flexible hose structure according to the finding, illustrated as a non-limiting example with the help of the attached tables of drawings, in which:

FIG. 1 is a perspective view of a portion of the hose structure according to the finding in a first preferred embodiment, with some parts removed to allow its inside to be seen;

FIG. 2 is an enlarged front view of a detail of the reinforcement layer belonging to the hose of FIG. 1;

FIG. 3 is an enlarged view of a detail of FIG. 2;

FIG. 4 is a first axial section view of the hose structure of FIG. 1 according to the plane line IV-IV;

FIG. 5 is a second axial section view of the hose structure of FIG. 1 according to the plane line V-V;

FIG. 6 is an enlarged front view of a detail of the reinforcement layer in a second preferred configuration;

FIG. 7 is an enlarged view of a detail of FIG. 6.

DETAILED DESCRIPTION OF A PREFERRED EMBODIMENT

With particular reference to the figures, the hose structure 1 according to the finding can be used to make a gardening hose, in particular for domestic uses.

The hose structure 1 can comprise an inner layer 2 or substrate that is substantially tubular and elongated to define a longitudinal axis L.

The inner layer 2 is made from a first polymeric material, preferably thermoplastic, and it can be intended to convey a fluid.

The inner layer 2 thus has at least one meshed reinforcement layer 3 and preferably a possible outer layer or coating and/or protective skin, not illustrated since of the per se known type, made from a second thermoplastic polymeric material, arranged on it.

The first and the second polymeric material, respectively constituting the substrate 2 and the skin, can comprise a plasticized PVC-based matrix.

Preferably, the inner layer 2 and the outer layer will be separated exclusively by one or more reinforcement layers 3, at least one of which is meshed.

Advantageously, both the inner layer 2 and the outer layer will be made through continuous extrusion of the respective thermoplastic materials.

Other layers, not illustrated, can also be foreseen, arranged in any position, according to the schemes typical for this type of hose, for example inside the inner layer 2 and/or outside the outer layer.

The meshed reinforcement layer 3 will preferably be arranged directly on the inner layer 2 and will consist of yarns of a fibrous material.

In particular, the reinforcement layer 3 comprises at least one first series 4 of yarns and at least one second series 5 of yarns of fibrous material.

The yarns of the first series 4 define first chained wales 6, 6', 6", . . . and first courses 7, 7', 7", . . . .

At least the courses 7, 7', 7", . . . are arranged on the inner layer 2 according to a helical progression with a first pitch P1 of predetermined length.

In turn, the yarns of the second series 5 define second chained wales 8, 8',8", . . . and second courses 9, 9',9", . . . with at least the courses 9, 9', 9", . . . arranged on the inner layer 2 according to a helical progression with a second pitch P2 of predetermined length.

Hereafter, for the sake of simplicity, the first and second courses and wales will be indicated with just the references without superscript, with it being understood that all of the characteristics relative to one of the wales or courses will be found, unless specified otherwise, in all of the other corresponding courses and wales.

According to a peculiar characteristic of the finding, the first pitch P1 is a multiple of the second pitch P2.

Moreover, each of the series of yarns 4, 5 can be formed from a respective number of yarns that are not necessarily the same as each other.

Advantageously, the first wales 6 and the second wales 8 will be mutually interlaced with respective meshes 10, 10', 10", . . . ; 11, 11', 11", . . . not linked.

As can be seen more clearly in the details of FIGS. 3 and 7, relative to two distinct non-exclusive embodiments of the finding, each mesh 10 of the first series of yarns 4 will be linked exclusively with meshes 10', 10" of the same first wale 6 and it will not be linked with any mesh 11, 11', 11", . . . of a corresponding second wale 8, and vice-versa.

In a preferred but not exclusive embodiment of the present finding, the first pitch P1 of the first courses 7 will be double the second pitch P2 of the second courses.

In this case, the number of yarns of the first series 4 will preferably be half the number of yarns of the second series 5.

Preferably, the first courses 7 and the second courses 9 will be inclined with respect to the longitudinal axis L with the same first predetermined angle of inclination $\alpha$.

In a first configuration of the meshed reinforcement layer 3, 5 illustrated in FIG. 1 and more clearly visible in FIG. 2, the first wales 6 and the second wales 8 will be substantially parallel to the longitudinal axis L.

In a second configuration, illustrated in FIG. 6, the first wales 6 and the second wales 8 will, on the other hand, be inclined with respect to the longitudinal axis L with a second predetermined angle of inclination $\beta$, also suitably coinciding for the first and the second wales 6, 8.

Advantageously, the first angle $\alpha$ and the second angle of inclination $\beta$ can be opposite, with not necessarily the same values, with respect to the longitudinal axis L, so as to increase the resistance of the hose 1 to kinking.

Suitably, the first angle of inclination $\alpha$ and the second angle of inclination $\beta$ can match one another.

Advantageously, in both of the configurations illustrated above, the first wales 6 will be angularly equidistant from one another.

Similarly, the second wales 8 will also be equidistant from one another with an angular distance coinciding with the angular distance between the first wales 6.

In this way, every second wale 8 will be overlapped to a corresponding first wale 6.

Therefore, in this peculiar configuration, each mesh 10, 10', 10", . . . of the first series of yarns 4 will be arranged below a pair of meshes 11, 11', 11", . . . of the second series of yarns 5.

However, it will also be possible to invert the positions with the meshes defining the courses with greater pitch arranged above the meshes defining the courses with shorter pitch.

Moreover, it should be observed that the portions of the first yarns 4 that join two consecutive meshes 10, 10' of a same first course 7 pass over the portions of the second yarns 5 that join two consecutive meshes 11, 11' of the same second course 9, so as to define the interlacing between the two series of yarns 4, 5.

In practice, defining a middle surface M for the tubular reinforcement layer 3, it should be observed that both the yarns of the first series 4 and those of the second series 5 cross such a middle surface on alternate sides in passing from one wale to another.

In this way, the reinforcement layer 3 will have a relatively low thickness with respect to common double-meshed reinforcement layers, but with better properties of resistance to pressure.

The hose structure 1 according to the finding can be made according to any way of operating known to the man skilled in the art.

Purely as an example, for the reinforcement layer 3 it is possible to use a knitting head with double cam needles, not illustrated, having a reel support able to rotate about the inner layer 2.

On the reel support there are, in alternation, reels of first 25 yarns 4 and second yarns 5, with the number and arrangement of the reels of each yarn selected as a function of the number of yarns that must define each series 4, 5.

The non-unitary relationship between the pitches P1 and P2 of the courses 7 and 9 will be consequent to the non-unitary relationship of first yarns 4 and second yarns 5. Moreover, when working, the corresponding needles will be moved with different frequencies. The reinforcement layer 3 can thus be obtained in a single step, speeding up and simplifying the entire production process of the hose.

From what has been described above, it is clear that the hose structure according to the finding achieves the preset purposes and in particular, that of making it possible to obtain a hose having increased resistance to bursting with respect to hoses of the prior art, while still keeping the addition of material for the reinforcement layer relatively low.

In particular, it has been observed experimentally that with a reinforcement layer 3 with a diameter of ⅝ of an inch, formed from first yarns 4 and second yarns 5 all made from polyester fiber with count of 1100 mN/tex, meshed to respectively define 20 and 40 meshes every 10 cm of axial length, with wales 6, 8 parallel to the longitudinal axis L of the inner layer 2, there was a resistance to bursting measured to be 28 bar, compared with 22.7 bar of a hose according to the prior art having single meshed reinforcement of equal diameter and 37 meshes per 10 cm of length.

In this case, there was also an expansion of the hose including the structure 1 according to the finding, in terms of variation of the outer diameter of the coating layer, that was measured to be close to 5.3% at an internal pressure of 6 bar and close to 14.4% at an internal pressure of 12 bar, compared with 9.6% and 22.3% for analogous tests with the known hose.

With a reinforcement layer 3 formed from first yarns 4 and second yarns 5 made from polyester fiber with a count of 1100 mN/tex, meshed to respectively define 19 and 38 meshes every 10 cm of length, measured along the wales 6, 8, with wales 6, 8 inclined with respect to the longitudinal axis L of the hose 1, there was a resistance to bursting that was measured to be 31.2 bar, compared with 23.8 bar of a hose according to the prior art, for example a hose produced by the same Applicant and commercialized with the name "NTS", having single meshed reinforcement with 37 meshes.

Moreover, the expansion detected for this hose according to the finding was 4.8% at an internal pressure of 6 bar and of 14.3% at an internal pressure of 12 bar, compared with 9.2% and 19.9%> for analogous tests with the known hose.

With a reinforcement layer 3 formed from first yarns 4 made from Kevlar® fiber and second yarns 5 of polyester fiber, meshed to respectively define 21 and 42 meshes, with wales 6, 8 parallel to the longitudinal axis L of the inner layer 2, there was a resistance to bursting that was measured to be 37.8 bar and percentage expansions at 6 bar and 12 bar, respectively, of close to 7.9% and 15.3%.

Finally, with a reinforcement layer 3 formed from first yarns 4 made from Kevlar® fiber and second yarns 5 made from polyester fiber, meshed to respectively define 20 and 40 meshes, with wales 6, 8 inclined with respect to the longitudinal axis L, there was a resistance to bursting that was measured to be 38 bar and percentage expansions at 6 bar and 12 bar, respectively, of close to 7.9%> and 14.7%.

The hose structure according to the finding can undergo numerous modifications and variants, all of which are covered by the inventive concept expressed in the attached claims. All of the details can be replaced by other technically equivalent elements, and the materials can be different according to requirements, without departing from the scope of the finding.

Although the hose structure has been described with particular reference to the attached figures, the reference numerals used in the description and in the claims are used to improve the understanding of the finding and do not constitute any limitation to the scope of protection claimed.

The invention claimed is:

1. A flexible hose structure, comprising:
   at least one inner tubular layer (2) made of a first polymeric material defining a longitudinal axis (L);
   at least one intermediate meshed reinforcing layer (3) placed on said inner layer (2) and made of yarns in a fibrous material; and
   an optional outer tubular covering layer made of a second polymeric material,
   wherein said intermediate meshed reinforcing layer (3) comprises,
      at least one first series of yarns (4) defining first chained wales (6, 6', 6", . . . ) and first courses (7, 7', 7", . . . ) with at least said first courses (7, 7', 7", . . . ) arranged with a helical pattern with a first pitch (P1) of predetermined length, and
      at least one second series of yarns (5) defining second chained wales (8, 8', 8", . . . ) and second courses (9, 9', 9", . . . ) with at least said second courses (9, 9', 9", . . . ) arranged with a helical pattern with a second pitch (P2) of predetermined length, and
   wherein said first pitch (P1) is a multiple of said second pitch (P2),
   and said first wales (6, 6', 6", . . . ) and said second wales (8, 8', 8", . . . ) are reciprocally interlaced with respective meshes (10, 10', 10", . . . : 11, 11', 11", . . . ) not mutually chained for independently exerting on said inner layer (2) a radial expansion strength.

2. The flexible hose structure according to claim 1, wherein said first pitch (P1) is double of said second pitch (P2), each of said first and second series of yarns (4, 5) having a predetermined number of yarns, the number of yarns of said first series (4) being half the number of yarns of said second series (5).

3. The flexible hose structure according to claim 1, wherein said first courses (7, 7', 7", . . . ) and said second courses (9, 9', 9", . . . ) are inclined with respect of said longitudinal axis (L) with a predetermined first inclination angle ($\alpha$).

4. The flexible hose structure according to claim 1, wherein said first wales (6, 6', 6", . . . ) and said second wales (8, 8', 8", . . . ) are inclined whit respect of said longitudinal axis (L) with a predetermined second inclination angle ($\beta$).

5. The flexible hose structure according to claim 4, wherein said first courses (7, 7', 7", . . . ) and said second courses (9, 9', 9", . . . ) are inclined with respect of said longitudinal axis (L) with a predetermined first inclination angle ($\alpha$), and wherein said first inclination angle ($\alpha$) and said second inclination angle ($\beta$) are reciprocally opposed with respect of said longitudinal axis (L).

6. The flexible hose structure according to claim 1, wherein said first wales (6, 6', 6", . . . ) and said second wales (8, 8', 8", . . . ) are substantially parallel to said longitudinal axis (L).

7. The flexible hose structure according to claim 1, wherein each of said second wales (8, 8', 8", . . . ) is overlapped to a corresponding first wale (6, 6', 6", . . . ).

8. The flexible hose structure according to claim 1, wherein at least one yarn of said first series (4) comprises a fiber having high tenacity of at least 1500 mN/tex as measured according to EN ISO 2062.

9. The flexible hose structure according to claim 8, wherein said high tenacity fiber is selected from the group consisting of aramid fibers, high modulus polyethylene fibers, polyether-ether-ketone fibers, carbon fibers, metallic fibers, basalt fibers, or hybrid fibers obtainable by coupling two or more fibers thereof.

10. The flexible hose structure according to claim 9, wherein the yarns of one or more of said first series (4) or said second series (5) are made of said high tenacity fiber.

* * * * *